US00RE45740E

(19) United States
(12) Reissued Patent
Vestling et al.

(10) Patent Number: US RE45,740 E
(45) Date of Reissued Patent: Oct. 13, 2015

(54) GUN SIGHT

(71) Applicant: NITOVES AB, Norrkoping (SE)

(72) Inventors: Niklas Vestling, Norrkoping (SE); Tobias Vestling, Norrkoping (SE)

(73) Assignee: NITOVES AB, Norrkoping (SE)

(21) Appl. No.: 29/456,164

(22) Filed: May 29, 2013

Related U.S. Patent Documents

Reissue of:
(64) Patent No.: Des. 651,681
Issued: Jan. 3, 2012
Appl. No.: 29/362,505
Filed: May 26, 2010

(30) Foreign Application Priority Data

Nov. 26, 2009 (EM) ..... 001182422

(51) LOC (10) Cl. ..... 22-01
(52) U.S. Cl.
USPC ..... D12/109
(58) Field of Classification Search
USPC ..... D22/108, 109, 110; 33/227, 229; 89/200–204; 359/399, 744, 823; 42/116, 120, 124, 125, 126, 133, 134, 42/135
See application file for complete search history.

(56) References Cited

U.S. PATENT DOCUMENTS 2,058,305 A * 10/1936 Forsling ..... 42/143
2,433,909 A * 1/1948 Jefferies ..... 42/141
D151,408 S * 10/1948 Richards ..... D22/109
3,368,454 A * 2/1968 Peck et al. ..... 89/14.05
4,223,446 A * 9/1980 Villa ..... 42/141
4,790,075 A * 12/1988 Howard, Sr. ..... 42/130
D347,164 S * 5/1994 Wodka ..... D8/395

* cited by examiner

*Primary Examiner* — Phillip S Hyder
(74) *Attorney, Agent, or Firm* — Young & Thompson

(57) CLAIM

The ornamental design for a gun sight, as shown and described.

DESCRIPTION

FIG. 1 is a perspective view of a gun sight showing our new design;
FIG. 2 is a another perspective view thereof;
FIG. 3 is a rear elevational view thereof, the appearance of the side opposite that shown in FIG. 3 being identical thereto;
FIG. 4 is a side elevational view thereof, the appearance of the side opposite that shown in FIG. 4 being identical thereto; and
FIG. 5, is a perspective views showing the gun sight in use;
FIG. 6, is another perspective views showing the gun sight in use; and,
FIG. 7, is another perspective views showing the gun sight in use.
[The material shown in broken lines forms no part of the claimed invention.] *The broken line showing of a shot gun in FIGS. 5, 6, and 7, is depicted for purposes of environment and forms no part of the claimed design.*

1 Claim, 2 Drawing Sheets

Figure 1:
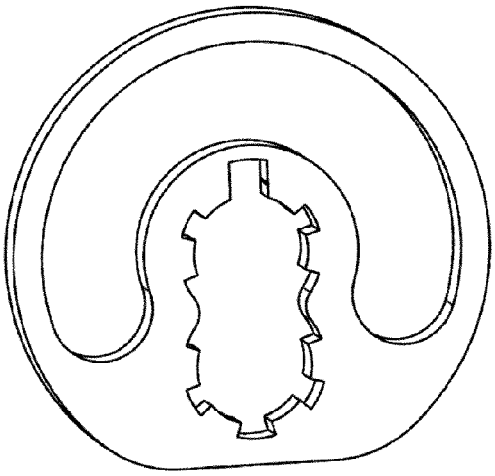
Figure 2:
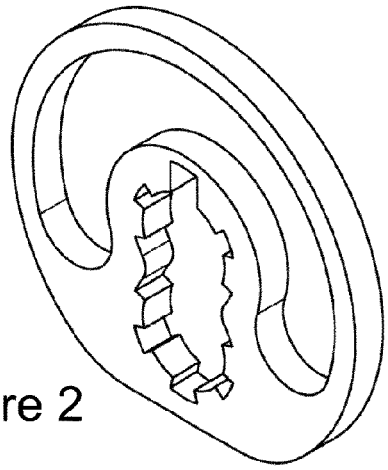
Figure 3:
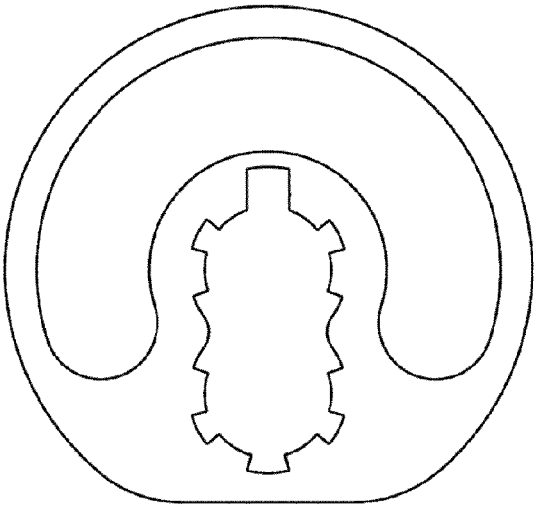
Figure 4:
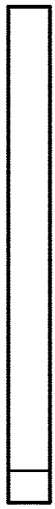
Figure 5:
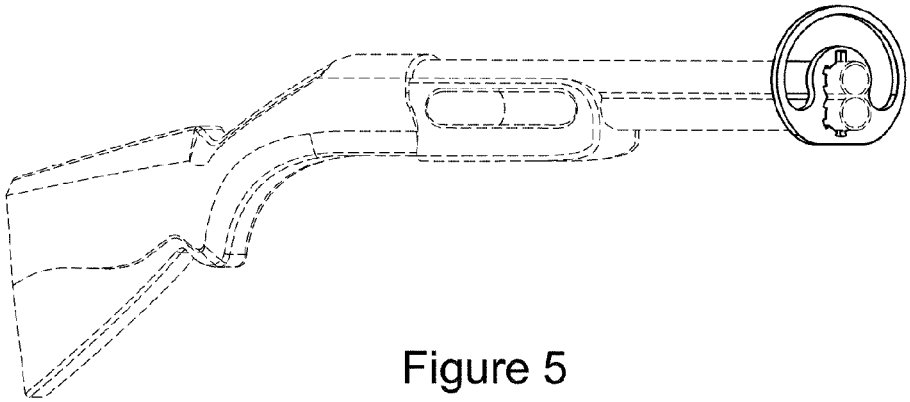
Figure 6:
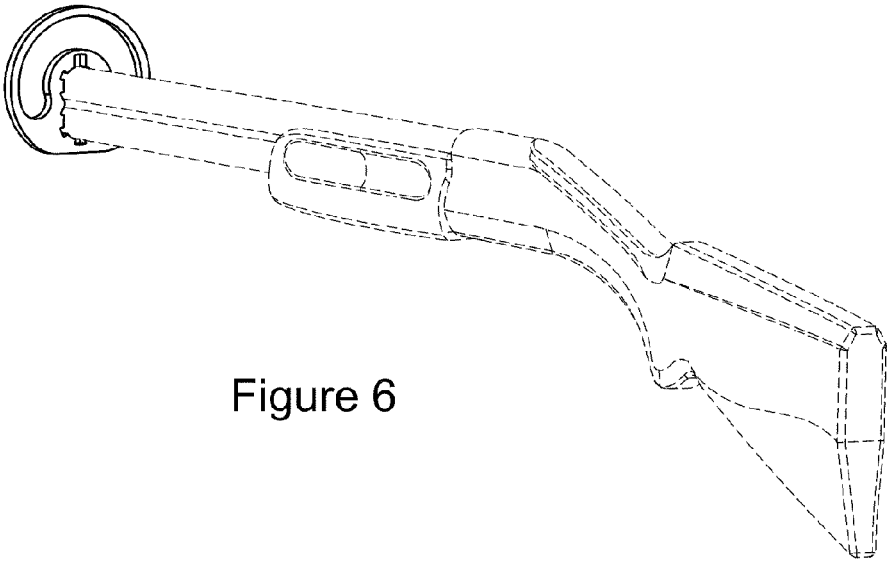
Figure 7:
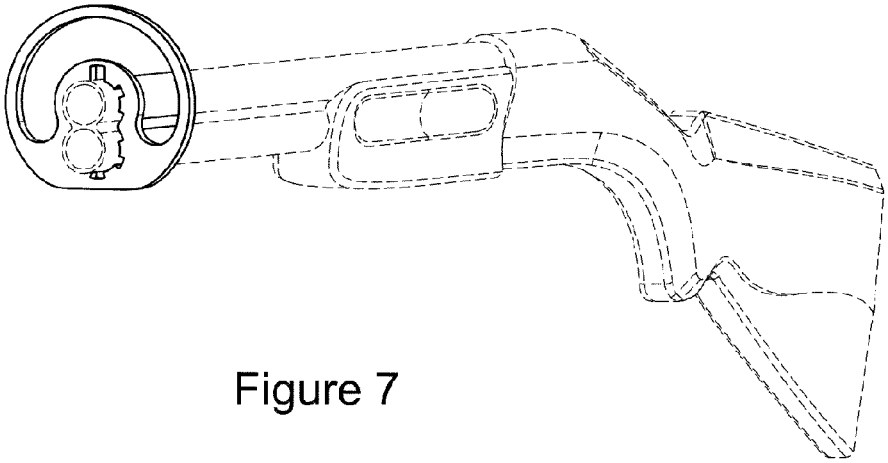

Matter enclosed in heavy brackets [ ] appears in the original patent but forms no part of this reissue; matter printed in italics indicates the additions made by reissue.